May 26, 1925.  
S. M. AKEYSON  
SWAB  
Filed May 10, 1923  
1,539,229  
2 Sheets-Sheet 1
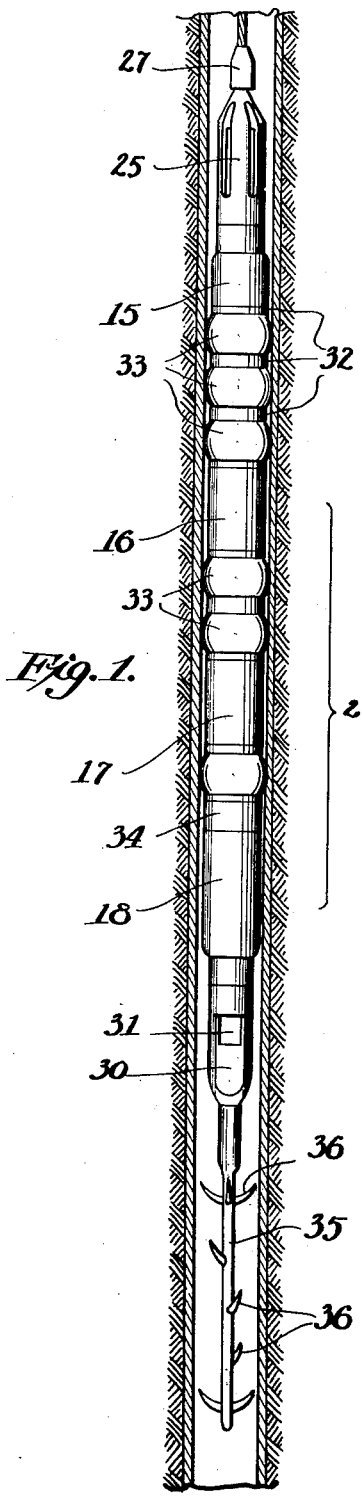
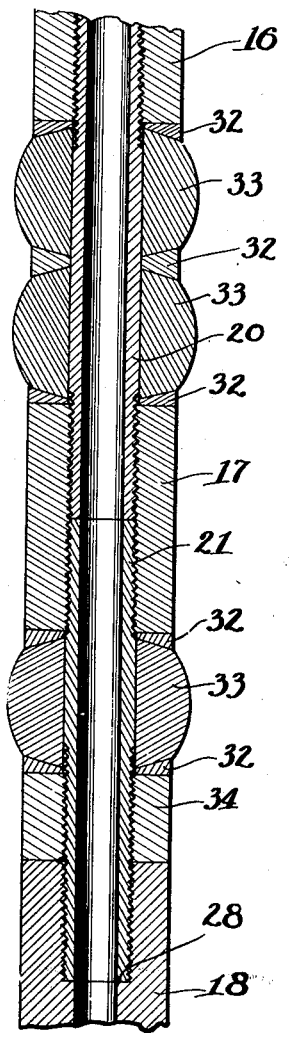
Inventor  
S. M. Akeyson  
by Hazard and Miller  
Attys May 26, 1925.
S. M. AKEYSON
SWAB
Filed May 10, 1923
1,539,229
2 Sheets-Sheet 2
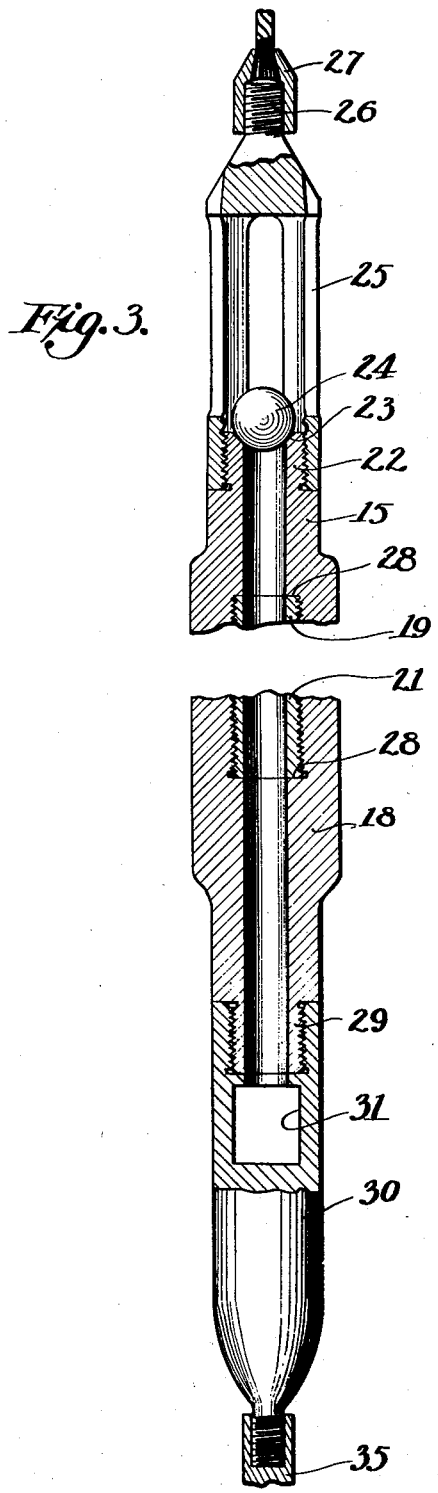
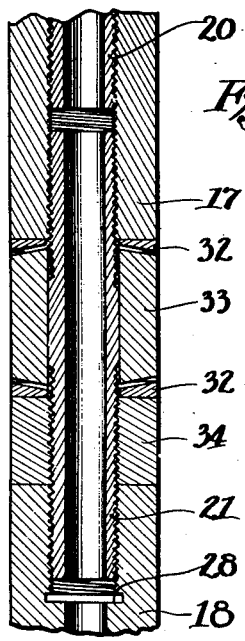
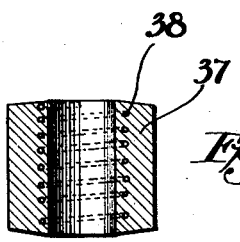
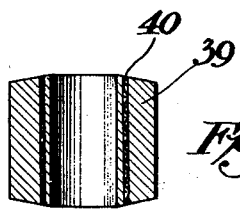
Inventor
S. M. Akeyson
by Hazard and Miller
Att'ys Patented May 26, 1925.

1,539,229

UNITED STATES PATENT OFFICE.

SWAN M. AKEYSON, OF LONG BEACH, CALIFORNIA, ASSIGNOR, BY MESNE ASSIGNMENTS, OF ONE-FOURTH TO ALBERT W. WARR, OF LOS ANGELES, CALIFORNIA, AND ONE-FOURTH TO W. J. HOLLAND, OF HUNTINGTON PARK, CALIFORNIA.

SWAB.

Application filed May 10, 1923. Serial No. 637,942.

*To all whom it may concern:*

Be it known that I, SWAN M. AKEYSON, a citizen of the United States, residing at Long Beach, in the county of Los Angeles and State of California, have invented new and useful Improvements in Swabs, of which the following is a specification.

My invention relates to swabbing devices for wells, and a purpose of my invention is a provision of swabbing device which is made up of a plurality of sections adjustably associated with each other to securely hold in expanded form resilient packing rings and in such manner that their peripheries will be caused to project various distances from the peripheries of the sections depending upon the adjustment of the sections.

It is also a purpose of my invention to provide a swabbing device which comprises washers interposed between the sections which are cupped to prevent the edges of the packing rings being exposed so as to reduce to a minimum the possibility of the rings becoming disengaged or torn from between the washers and ultimately lost from the swabbing device.

A further purpose is the provision of a safety spear adapted for use in connecting with my swabbing device or similar devices for preventing the accidental removal of the packing rings from the device should the packing rings by any chance become disengaged from between the washers.

Another purpose of my invention is a provision of a novel form of packing ring particularly adapted for use in connecting with swabbing devices, and which is reinforced against excessive compression and expansion.

Although I have herein shown and described only one form of swabbing device embodying my invention, it is to be understood that various changes and modifications may be made herein without departing from the spirit of the invention and the spirit and scope of the appended claims.

In the accompanying drawings,

Figure 1 is a view showing one form of swabbing device embodying my invention in applied position within a well.

Fig. 2 is an enlarged fragmentary sectional view of that portion of the swabbing device shown in Fig. 1 embraced by the bracket 2.

Fig. 3 is a vertical sectional view of the swabbing device shown in Fig. 1, a portion thereof being broken away.

Fig. 4 is a fragmentary sectional view of the swabbing device before the packing rings are compressed to active position.

Figs. 5 and 6 are vertical sectional views of two forms of packing rings embodying my invention.

Similar reference characters refer to similar parts in each of the several drawings.

Referring specifically to the drawing and particularly to Fig. 1, my swabbing device in its present embodiment is shown as comprising an elongated body made up of a plurality of tubular sections designated at 15, 16, 17 and 18, and although I have mentioned only four sections it is to be understood that any number can be employed without departing from the spirit of my invention. These sections 15, 16, etc., are adjustably connected through the medium of tubular connecting members 19, 20 and 21 which, as clearly shown in Figs. 2 and 3, are exteriorly threaded for engagement with the threaded bores of the tubular sections 15, 16, etc.

As clearly shown in Fig. 3, the uppermost section 15 is provided with a reduced and exteriorly threaded extension 22 provided with a valve seat 23 upon which is adapted to repose a ball valve 24. A valve cage 25 threadedly engages extension 22 and is formed at its upper end with a threaded projection 26 to which is connected a cable coupling member 27. The lowermost section 18 as well as the uppermost section 15 are provided internally with annular shoulders 28 against which abut the adjacent ends of the tubular connecting members 19 and 21. The lowermost section 18 is provided with an extension 29 similar to the extension 22, and this extension carries the spear supporting member 30 provided with an opening 31 through which liquid is admitted to the bore of the section 18 so as to flow upwardly through the swabbing device and finally discharge therefrom by lifting the ball valve 24.

As clearly shown in Figs. 2 and 4, the tubular connecting members 19, 20 and 21 have slidably fitted thereon washers 32 between which are arranged resilient packing rings 33 preferably formed of rubber. These packing rings normally occupy contracted position as shown in Fig. 4 wherein their peripheries are substantially flush with the peripheries of the sections 15, 16, etc. However, upon an adjustment of the sections toward each other the washers 32 are moved to cause an axial compression of the washers thereby effecting radial expansion so that their peripheries project beyond the peripheries of the sections as clearly shown in Fig. 2. The distances which the packing rings project at their peripheries of course depends upon the adjustment of the sections with respect to each other so that any desired expansion of the packing rings can be secured to provide effective sealing means between the swabbing device and the casing and to take up the wear of the packing rings.

To prevent the packing rings from becoming accidentally disengaged from between the washers, as often occurs with swabbing devices heretofore proposed, I have formed the confronting sides of the washers 32 of convex or cupped shape so that in the compresed condition of the packing rings, the edges of the latter will be completely covered by the washers to prevent their being engaged by the walls of the well casing or tubing and thus torn from the swabbing device. By referring to Fig. 1 it will be seen that I have provided three packing rings between the sections 15 and 16, two packing rings between the sections 16 and 17, and one packing ring between the sections 17 and 18. Of course, the necessary number of washers 32 are provided between these sections to properly compress the packing rings as will be understood. It is to be understood however, that my invention is not limited to this particular number and arrangement of packing rings and washers, but it is preferred that the greatest number of rings be between the two uppermost sections to provide an effective sealing means to prevent the passage of liquid from the upper side of the swabbing device to the lower side thereof.

To prevent displacement or loosening of the lowermost section 18 from the corresponding connecting member 21, a lock nut 34 is mounted upon the member 21 so that after such member is in abutting relation to the shoulder 28, the nut can be adjusted to contacting relation with the upper end of the section 18 thereby securing said section against movement upon the connecting member.

As shown in Fig. 1, the member 30 carries a spear including a shank 35 provided with prongs 36. Four prongs are arranged at the upper end of the shank and in circumferentially spaced relation while at the lower end of the shank two prongs are arranged at diametrically opposed points. Between the upper and lower prongs other prongs are provided and arranged spirally. All of the prongs 36 are curved upwardly so that should any of the packing rings become disengaged from the swabbing device they will be caught by the prongs so as to prevent them from dropping into the well.

Referring now to Figs. 5 and 6, I have shown two forms of packing rings, either of which can be substituted for the rings 33 shown in Fig. 2. The packing rings shown in Fig. 5 comprise a body 37 formed of resilient material such as rubber or the like, and in which is imbedded a coil spring 38. This spring is arranged adjacent the bore of the ring so that when the ring is in applied position upon the swabbing device, the spring will serve to maintain the ring in contiguous relation with respect to the connecting member 19, 20 or 21, and to prevent excessive expansion of the ring when compressed through an adjustment of the sections. The ring shown in Fig. 6 includes a body 39 of resilient material in which is imbedded, adjacent its bore, a tubular piece of canvas 40 which serves the same purposes as the spring 38 of the ring shown in Fig. 5. It will be noted that both the spring and canvas substantially reinforce the rings to prevent tearing thereof or disengagement from between the washers when in applied position upon the swabbing device.

What I claim is:

1. A swabbing device for wells comprising tubular sections and tubular connections arranged end to end, and adjustably connected to each other, and packing rings upon the tubular connections between the sections adapted by an adjustment of the sections to be compressed axially and expanded radially to cause their peripheries to project from the peripheries of the sections, there being cupped washers at the ends of the packing rings.

2. A swabbing device for wells comprising tubular sections and tubular connections arranged end to end and adjustably connected to each other, cupped washers between the sections, and packing rings between the washers adapted by an adjustment of the sections to move the washers to cause the rings to be compressed axially and thus expanded radially thereby projecting their peripheries beyond the peripheries of the sections.

3. A swabbing device for wells comprising tubular sections, tubular connecting members between the sections and associated therewith to permit an adjustment of any one section with respect to the other, cupped washers upon the connecting members and packing rings between the sections and mounted on said connecting members, between the cupped washers, whereby said packing rings can by an adjustment of the sections be compressed to cause their peripheries to project beyond the peripheries of the sections.

4. A swabbing device for wells comprising tubular sections, tubular connecting members between the sections and associated therewith to permit an adjustment of any one section with respect to the other, cupped washers mounted on the connecting members and arranged between the sections, and packing rings between the washers.

5. A swabbing device for wells comprising tubular sections having threaded bores, connecting members for the sections exteriorly threaded for engagement with the bores, said members being tubular and providing a continuous passageway between the sections, cupped washers mounted on the connecting members and arranged between the sections, and resilient packing rings between the washers.

6. In combination a swabbing device having packing rings thereon, and means carried by said device for retaining the packing rings against complete displacement from the device.

7. In combination a swabbing device having packing rings thereon, and a spear depending from the device and having upwardly extending prongs for the purpose described.

8. A spear for swabbing devices comprising a shank, and upwardly curved prongs extending from the shank at various points along the length of the shank.

9. A packing ring comprising a resilient body, and a tubular piece of inelastic material imbedded within the body in the manner and for the purpose described.

In testimony whereof I have signed my name to this specification.

S. M. AKEYSON.